(12) United States Patent
Buckner

(10) Patent No.: US 7,980,581 B2
(45) Date of Patent: Jul. 19, 2011

(54) PROTECTIVE DEVICE

(75) Inventor: Todd T. Buckner, Tifton, GA (US)

(73) Assignee: Design-Build-Buckner, LLC, Tifton, GA (US)

( * ) Notice: Subject to any disclaimer, the term of this patent is extended or adjusted under 35 U.S.C. 154(b) by 21 days.

(21) Appl. No.: 12/460,000

(22) Filed: Jul. 10, 2009

(65) Prior Publication Data

US 2011/0006503 A1    Jan. 13, 2011

(51) Int. Cl.
*B62J 27/00*    (2006.01)

(52) U.S. Cl. .................. 280/304.3; 296/78.1; 297/411.2

(58) Field of Classification Search ............... 280/304.3, 280/304.1, 304.4; 296/78.1; 297/411.2, 297/411.26, 411.45, 227
See application file for complete search history.

(56) References Cited

U.S. PATENT DOCUMENTS

| | | | |
|---|---|---|---|
| 2,891,604 A * | 6/1959 | Soucie | 297/411.26 |
| 3,074,762 A * | 1/1963 | Kris | 297/411.46 |
| 3,103,386 A | 9/1963 | Kerr | |
| 3,222,105 A | 12/1965 | Cross | |
| 3,462,188 A | 8/1969 | Edgar | |
| D243,304 S * | 2/1977 | Fuqua | D6/610 |
| 4,141,567 A | 2/1979 | Scott | |
| D319,992 S | 9/1991 | Acerbis | |
| 5,405,109 A * | 4/1995 | Nordnes | 248/118.3 |
| 5,478,137 A * | 12/1995 | Olson et al. | 297/411.26 |
| D382,165 S | 8/1997 | Ruiz | |
| 5,740,700 A * | 4/1998 | Redmond | 74/551.8 |
| 5,842,745 A | 12/1998 | Kelly et al. | |
| 7,077,479 B1 * | 7/2006 | Phillips | 297/463.2 |
| 7,261,374 B2 * | 8/2007 | Potosky | 297/227 |
| 7,708,298 B1 * | 5/2010 | Folsom | 280/304.3 |

* cited by examiner

*Primary Examiner* — Kevin Hurley
*Assistant Examiner* — Tashiana Adams
(74) *Attorney, Agent, or Firm* — John P. Sinnott; Langdale Vallotton, LLP

(57) ABSTRACT

The device protects the forearm, hand and fingers of a wheelchair occupant from injury through collision with obstacles by providing a shield that curves over the occupant's forearm. The shield ends in a compound curve that extends over the occupant's hand and fingers, curving inwardly toward the armrest. To accommodate the manually manipulated controls for motorized wheelchairs that usually protrude upwardly from the forward end of the armrest, the shield is appreciably longer than the base for the device to form a gap between the base and the shield that accommodates these controls while nevertheless continuing to protect the occupant's hand and fingers. Several ways in which the device can be attached to different classes of wheelchairs and device dimensions suitable for these classes also are shown and described.

3 Claims, 4 Drawing Sheets

PROTECTIVE DEVICE

CROSS REFERENCES TO RELATED APPLICATIONS

None

FEDERALLY SPONSORED RESEARCH OR DEVELOPMENT

None

NAMES OF PARTNERS TO A JOINT RESEARCH AGREEMENT

None

REFERENCE TO "SEQUENCE LISTING"

None

BACKGROUND OF THE INVENTION

1. Field of the Invention

This invention relates to protective devices for attachment to wheelchairs and, more particularly, to a shield for attachment to a wheelchair armrest that extends over the arm of the occupant and forward of the forearm to protect the occupant's fingers, and the like.

2. Description of the Prior Art

Upper body supports for wheelchair occupants have been proposed for attachment to wheelchair armrests. These supports each have a backwall that protrudes upwardly from a base in general alignment with the back of the wheelchair. Perpendicular to and forward from the backwall is a sidewall that also protrudes upwardly from the base and outside of the armrest. Thus, the forearms of the wheelchair occupant rest within the areas defined by the back and sidewalls of each of the supports.

These supports, however, leave much to be desired with respect to protecting the occupant's forearms from cuts, abrasions and the like through collisions with walls and other obstacles. Injuries of this nature are particularly dangerous for elderly wheelchair occupants not only because older persons have very frail skin that is easily damaged, but also because the elderly frequently are prescribed blood thinner medications that may aggravate frail skin conditions. Further, in this respect because of age, older people usually do not enjoy the good vision and quicker reflexes of the young, thereby increasing the likelihood of collision injuries.

Electrically powered wheelchairs introduce a further and potentially more serious source of injury. For instance, the manually operated motor controls that regulate the speed and direction of powered wheelchairs usually are mounted on the front of the occupant's right armrest. On approaching an obstacle, the wheelchair occupant, and particularly an elderly occupant, may not be able to manipulate the controls swiftly enough to avoid jamming an exposed and unprotected hand against an obstacle. As a consequence, the collision might break one or more of the occupant's hand or finger bones.

Consequently, there is a need for significantly improved protection for wheelchair occupants' arms and hands.

BRIEF DESCRIPTION OF INVENTION

These and other inadequacies of the prior art are overcome to a large extent through the practice of the invention.

To satisfy the need more completely it must be recognized that a truly suitable protective device must be made available in an array of sizes that will adapt to the armrest structural configuration of the two classes of wheelchair on the market. Generally, wheelchairs are available as either manually operated or electrically motorized mobile chairs.

In accordance with the invention, a protective device that characterizes salient features of the invention not only protrudes above the armrest structure, but also curves over the areas ordinarily occupied by a forearm on that armrest. As a result, the forearm is better protected from injury caused by contact with obstacles. Further, and as an additional feature of the invention, the extreme forward end of the curved protective device continues beyond the end of the armrest to which it is attached to provide a cover for the occupant's otherwise exposed hand and fingers. This cover, moreover, curves over and around the occupant's fingers.

To adapt to a motorized wheelchair, however, the underside of the protective device has a reentrant recess or bight that accommodates the motor controls protruding upwardly from the armrest.

Thus, a protective device in accordance with principles of the invention protects both the occupant's forearm from injury and also the occupant's fingers and hand from fractures, broken bones, and, at least, painful bruising.

For a more complete appreciation of the invention attention is invited to the following detailed description of preformed embodiments of the invention, the invention being limited only by the scope of the claims appended hereto.

DETAILED DESCRIPTION OF THE PREFERRED EMBODIMENTS

Figure 1:
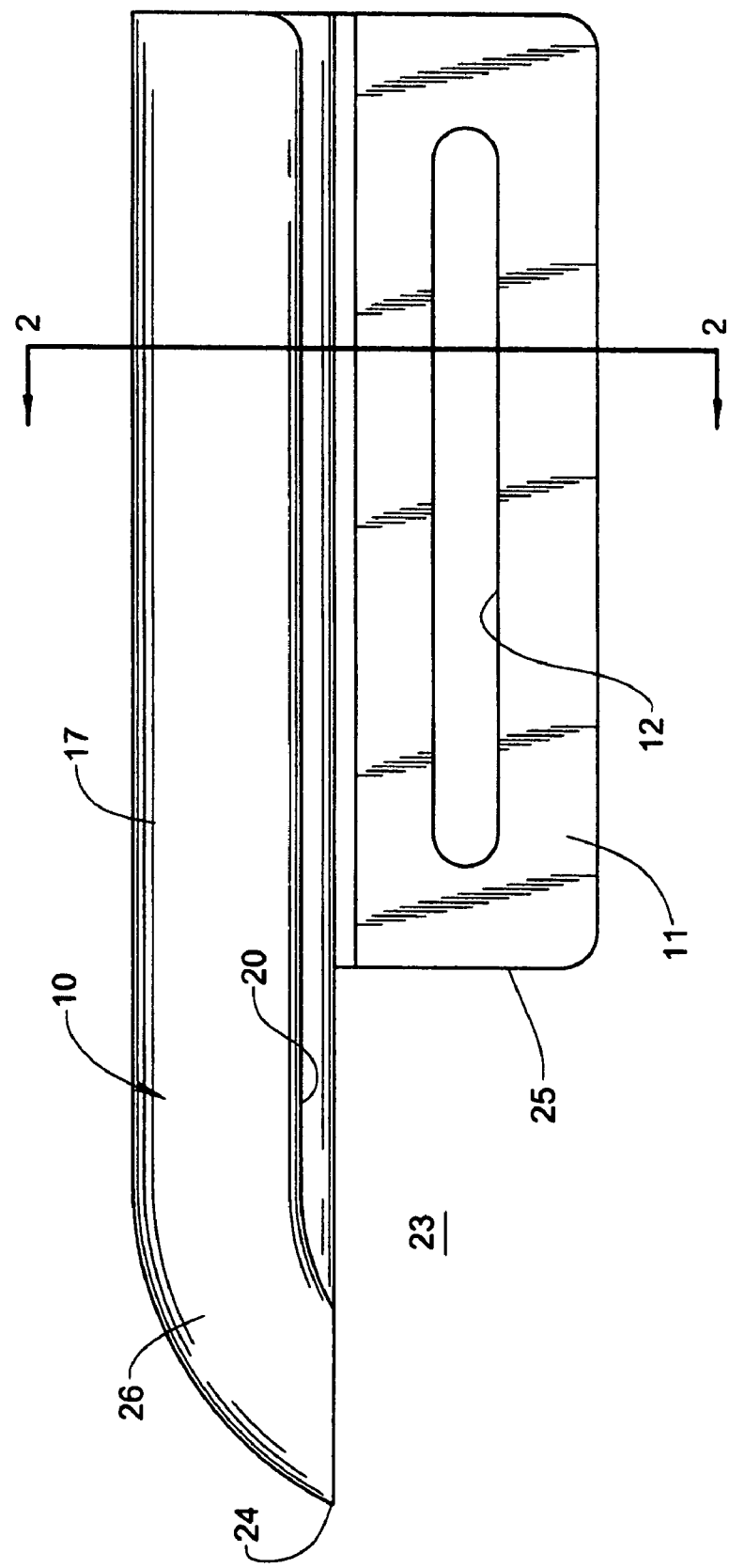
FIG. 1 is a plan view of an embodiment of the invention adapted for use with a motorized wheelchair.

As illustrated in FIG. 1, a protective device 10 is formed of an appropriately sturdy plastic or other suitable material that will sustain the wear and tear of ordinary wheelchair use.

Figure 2:
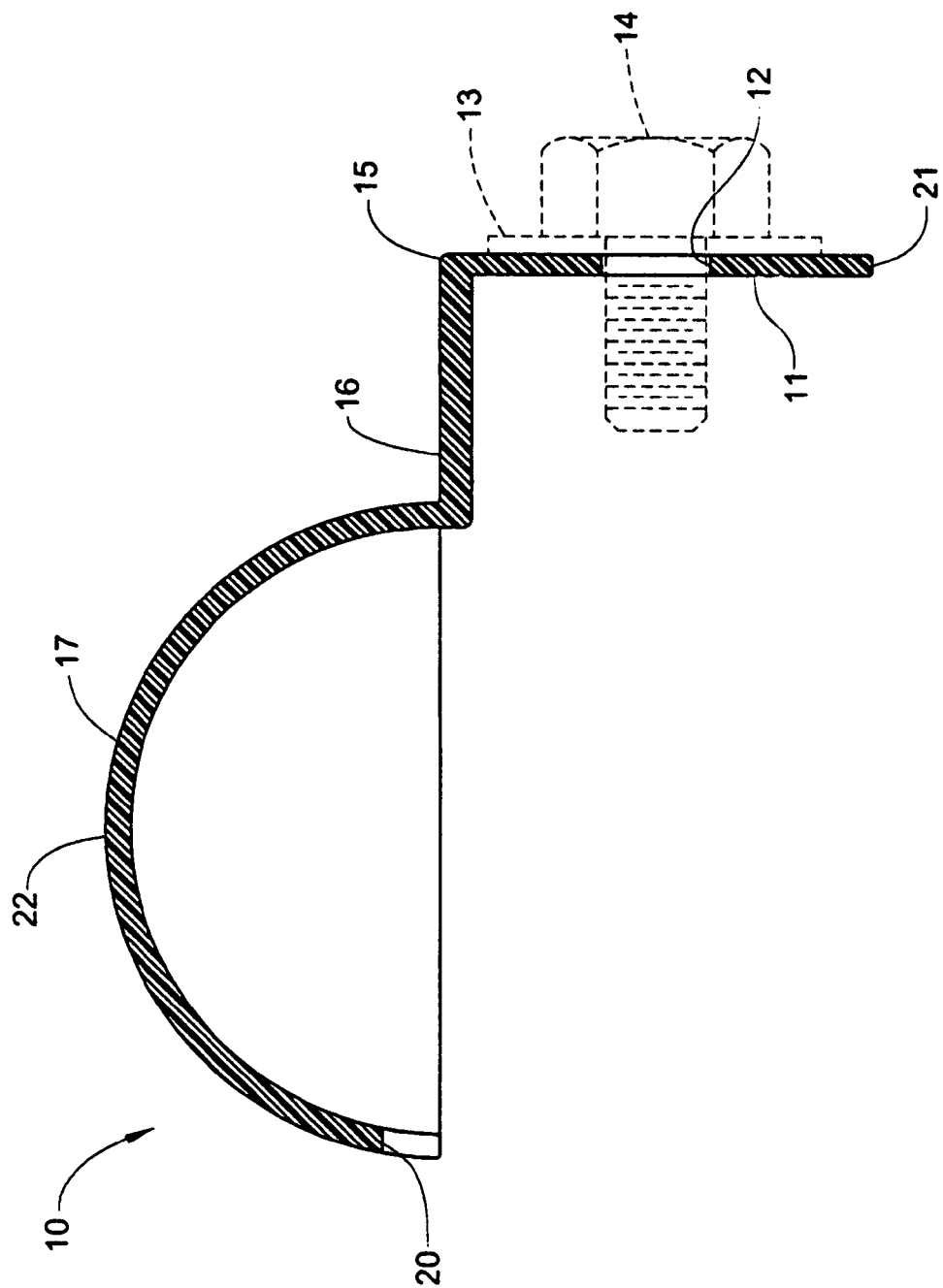
FIG. 2 is a full section of the invention shown in FIG. 1, taken along the section line 2-2 of FIG. 1 and viewed in the direction of the arrows.

Attention now is invited to FIG. 2 which illustrates the protective device 10 suitable for attachment to a motorized wheelchair (not shown in the drawing). The protective device 10 has a base 11 that has a means for attachment to the armrest structure, shown as a lengthwise slot 12 for joining the protective device 10 to the underside of the motorized wheelchair's armrest. For example, a washer 13, shown in broken lines, broader than the width of the slot 12 enables a bolt 14 (also shown in broken lines) to attach the protective device 10 to the underside of the wheelchair armrest. In this manner, the protective device 10 can be joined to armrests on any number of different motorized wheelchair designs through the flexibility offered by the ability to position the bolt 14 along the length of the slot 12 (FIG. 1) in accordance with the accessibility of a tapped borehole in the armrest.

An edge 15 of the base 11 enables a generally flat vertical sidewall 16 to extend upwardly, paralleled with the outside of the armrest to which the device 10 is joined. At the top of the armrest the device 10 has, in accordance with a feature of the invention, an arcuate shield 17 that curves outward and upward of the sidewall 16 for a short distance before it curves back 20 toward the top of the armrest. The chord of the arcuate shield 17 is sufficiently great to allow the forearm of the wheelchair occupant to be received within the shield 17 and below the back curvature 20.

The illustrative embodiment of the device 10 shown in FIG. 2 has an overall width of 4.78 inches from the edge 21 of the base 11 to point 22 of the shield 16 at which the curvature of the shield 17 changes direction in toward the armrest. The overall height, moreover, of the device 10, from the end of the back curvature 20 to the base 11 is 5.73 inches.

Turning back to FIG. 1, the slot 12 in the base 11 can be seen. Also shown is shield end 24 that establishes the entire length of the shield 17 as considerably longer than the corresponding dimension of the base 11 and the associated sidewall 16 (FIG. 2). For example, the overall length of the shield 17 is 15.95 inches for the specific embodiment of the invention shown in FIG. 1. As a result, a bight or reentrant recess 23 is formed between the end 24 of the shield 17 and end 25 of the base 11.

Although not shown in the Drawing, the bight 23 enables motor controls for the motorized wheelchair to protrude into the volume above the base 11 that is still within the volume defined by the shield 17. Particular attention is invited to compound shield curvature 26 as that forward portion of the shield 17 draws to the end 24. The compound curvature 26 curves inwardly toward the sidewall 16 and downwardly toward the armrest structure to establish a gap within the shield end 24 that will accommodate and protect he occupant's fingers and hand (not shown in the drawing).

In operation, as shown in FIG. 2, the bolt 14 and the associated washer 13 presses the base 11 of the device 10 against the underside of the armrest. For the purpose of stability, it is advisable to use a second bolt and washer assembly (not shown in the drawing) to join the base 11 to the underside of the armrest. The wheelchair occupant then places a forearm in the protected volume over the armrest provided by the shield 17. The occupant's fingers can reach the motor controls within the bight 23, the fingers being protected by the compound shield curvature 26.

Figure 3:
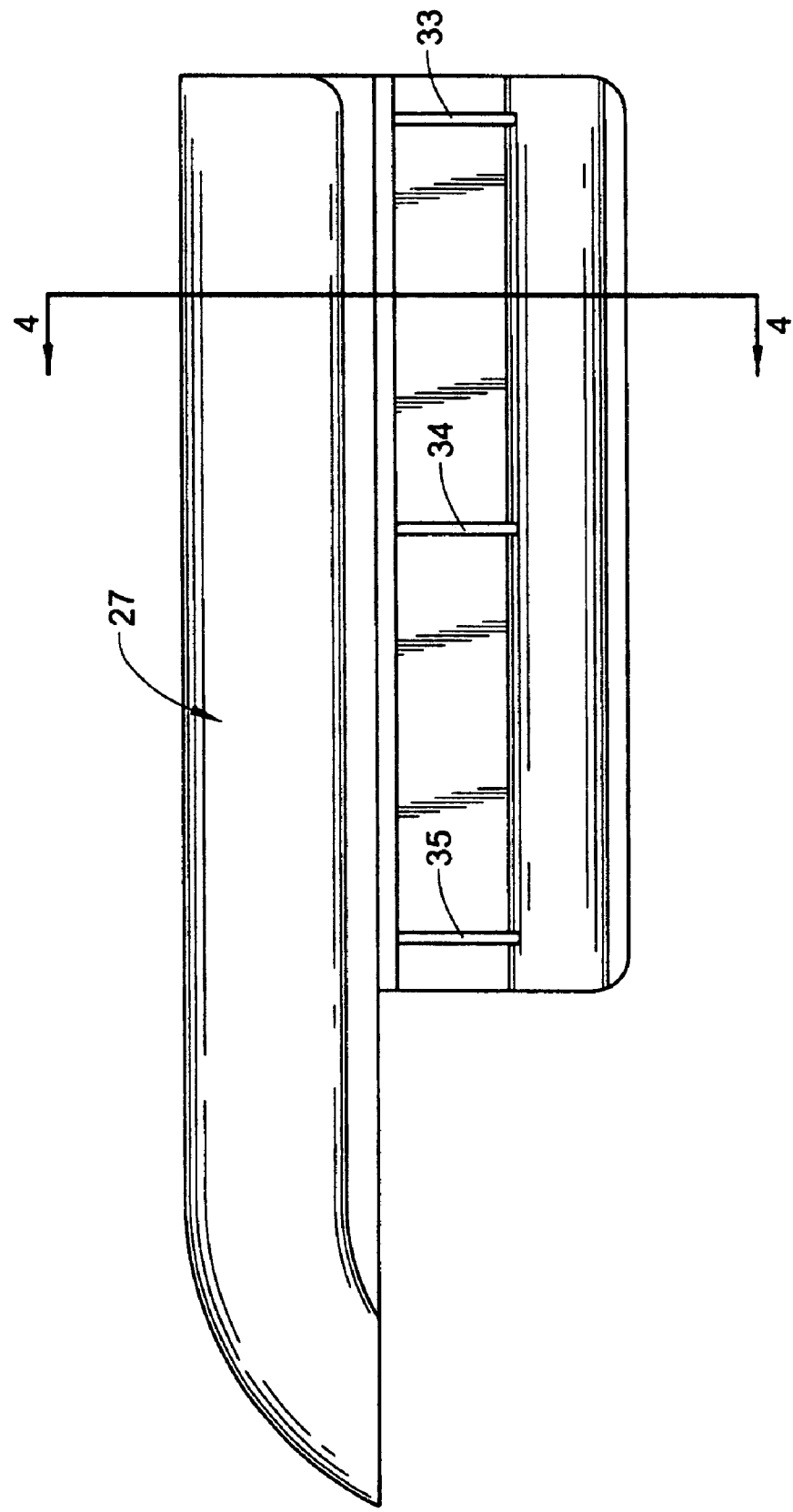
FIG. 3 is a plan view of the protective device that characterizes the invention adapted for use with a manual wheelchair.

Attention now is invited to FIG. 3 and protective device 27. The device 27 is suitable for use with manually operated wheelchairs and much of the following description is directed to a difference in the way in which the device 27 is attached to an armrest structure.

Figure 4:
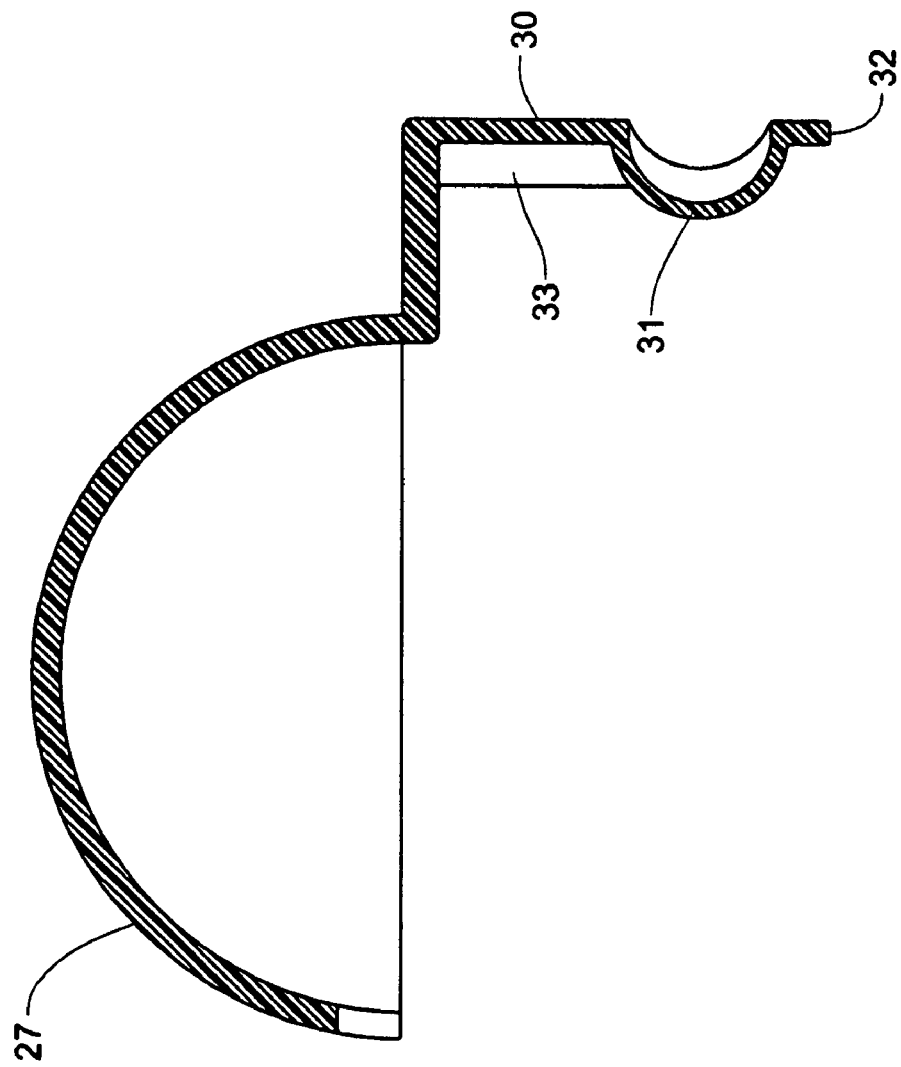
FIG. 4 is a full section of the invention shown in FIG. 3, taken along the line 4-4 of FIG. 3 and viewed in the direction of the arrows.

Turning now to FIG. 4, a base 30 has an arcuate recess 31 formed parallel with edge 32 of the base 30. The recess 31 has a diameter that is sufficient to enable the recess 31 to clamp over a metal support tube (not shown in the Drawing) that supports the armrest (also not shown). Stiffening ribs 33, 34 and 35 (FIG. 3) are formed in the base 30 to add strength and stability to the protective device 27. In this way, the device 27 is secured to the wheelchair, the base 30 of the device 27 being clamped between the support tube and its associated armrest. For the specific embodiment of the invention as it is applied to a manual wheelchair, an overall width of 4.56 inches and a height of 5.31 inches has been found to be satisfactory. The preferred length, moreover, is 15.91 inches.

It should be noted that both of the adaptations of the invention shown and described above are directed to the right armrest of the respective wheelchairs. Clearly, for the left armrest, mirror images of the structures shown and described will be suitable for mounting on the left armrest. Further, it should be noted that protective devices in accordance with the principle of this invention can be adapted to wheelchairs, both motorized and manual that have substantially shorter armrests, e.g. "desk length" armrests.

In this circumstance, for a "desk length" motorized device, an overall height of 5.73 inches and width of 4.78 inches continues to be effective although the length of the protective device should be reduced to 9.25 inches. With respect to manual "desk length" wheelchairs it has been found preferable to reduce the width of the device to 4.46 inches while keeping the overall height of the device at 5.31 inches. The overall length of the "desk length" protective device, moreover, also should be reduced to 9.25 inches.

Thus, there is provided in accordance with features of the invention a significantly improved protective device that reduces wheelchair occupant injuries.

What is claimed is:

1. A forearm, hand and fingers protective device for attachment to a wheelchair armrest structure having an exposed outer side comprising a base, a means for attaching the base to the armrest structure, a sidewall formed on said base to parallel the exposed outer armrest side, an arcuate shield formed on said sidewall and spaced from said base, said arcuate shield extending outward of said armrest and thereover, said shield being spaced from the armrest through a distance sufficient to enable the forearm to be received therewithin said shield further having an end and a length greater than said base, said base and said greater shield length forming a bight, a compound curvature at said shield end, said compound curvature turning said shield end toward said sidewall and toward the armrest structure and spaced from the armrest structure to protect the hand and the fingers, said means for attaching the base to the armrest structure further including said base having a slot formed therein, at least one bolt for penetrating said slot to protrude into and engage the armrest structure and attach the protective device to the armrest structure.

2. A protective device according to claim 1 that further comprises at least one washer for bridging said slot and enabling said bolt to engage the armrest.

3. A forearm, hand and finger protective device for attachment to a wheelchair armrest structure having an exposed outer side comprising a base, said base having a slot formed therein, at least one bolt for penetrating said slot to protrude into and engage the armrest structure and attach the protective device to the armrest structure, at least one washer for bridging said slot and enabling said bolt to engage the armrest structure, a sidewall formed on said base to parallel the exposed outer armrest side, an arcuate shield formed on said sidewall and spaced from said base a distance from 5.31 inches to 5.73 inches, said shield extending outward of said armrest and to curve over said armrest and terminate thereover, said shield and said base establishing a width for the protective device from 4.46 inches to 4.78 inches to enable the forearm to be received therewithin, an end on said shield greater than the length of said base, said base length and said greater shield length forming a bight, wherein said shield length has a distance from 9.25 inches to 15.91 inches, a compound curvature formed at said shield end, said compound curvature turning said shield end toward the armrest structure and toward said sidewall and spaced from said armrest structure to protect the hand and the fingers.

* * * * *